United States Patent [19]

Saupe et al.

[11] Patent Number: 5,368,770
[45] Date of Patent: Nov. 29, 1994

[54] METHOD OF PREPARING THIN LIQUID CRYSTAL FILMS

[75] Inventors: Alfred Saupe; Antal Jakli, both of Kent, Ohio

[73] Assignee: Kent State University, Kent, Ohio

[21] Appl. No.: 891,790

[22] Filed: Jun. 1, 1992

[51] Int. Cl.$^5$ .................... C09K 19/52; G02F 1/13
[52] U.S. Cl. .................... 252/299.01; 252/399.5; 359/51; 359/52
[58] Field of Search .................... 252/299.01, 299.5; 359/51, 52

[56] References Cited

U.S. PATENT DOCUMENTS

| | | | |
|---|---|---|---|
| 3,885,982 | 5/1975 | Ferguson | 106/252 |
| 4,022,706 | 5/1977 | Davis | 252/299.01 |
| 4,685,771 | 8/1987 | West et al. | 359/51 |
| 4,890,902 | 1/1990 | Doane et al. | 252/299.01 |
| 5,087,387 | 2/1992 | Mullen et al. | 252/299.5 |
| 5,116,528 | 5/1992 | Mullen et al. | 252/299.5 |
| 5,239,474 | 7/1993 | Stupp | 526/298 |

FOREIGN PATENT DOCUMENTS 0313053  4/1989  European Pat. Off. .

OTHER PUBLICATIONS

Broer, J. et al. *Macromolecular Chemistry and Physics*, vol. 189, pp. 185–194 (1988).
R. A. M. Hikmet, *Journal of Applied Physics*, vol. 68, pp. 4406–4412 (1990).

*Primary Examiner*—Shean Wu
*Attorney, Agent, or Firm*—Watts Hoffmann Fisher & Heinke

[57] ABSTRACT

A liquid crystalline paste material is formed by polymerization of a solution containing a mesogenic solvent and monomeric material in bulk. The paste provides an improved method of preparing thin electrically addressable light modulating films by coating the paste onto a suitable substrate.

19 Claims, No Drawings

METHOD OF PREPARING THIN LIQUID CRYSTAL FILMS

FIELD OF THE INVENTION

The present invention relates to a method of preparing thin electrically addressable liquid crystal films. The method is directed to the preparation of electro-optical light modulating liquid crystalline materials that have a paste like consistency which enables them to be spread into thin films on an appropriate substrate.

BACKGROUND OF THE INVENTION

Electrically switchable liquid crystal-polymer films intended for use in various electro-optical devices have been prepared by a procedure that involves phase separation of nematic liquid crystal from a homogeneous solution of liquid crystal and synthetic resin to form a liquid crystal phase interspersed with a polymer phase. Some advantages of these films are discussed in U.S. Pat. Nos. 4,671,618; 4,673,255; 4,685,771; 4,688,900 and 4,890,902, the disclosures of which are incorporated herein by reference.

A further development of liquid crystal-polymer films disclosed in U.S. Pat. No. 4,994,204, involves the use of a birefringent polymer, e.g., a liquid crystal polymer. The films prepared with birefringent polymer have the characteristic of displaying haze-free transparency for all directions of incident light. This is accomplished by matching the ordinary and extraordinary indices of refraction of the polymer to the ordinary and extraordinary indices of refraction of the liquid crystal. Films made with birefringent polymer can operate in a normal manner so that they are clear in the field-ON state and light scattering in a field-OFF state or, alternatively, can operate in a reverse or "fail-safe" mode where the material is clear in the absence of a field and is light scattering in the field-ON state.

In each case, the prior liquid crystal-polymer films are prepared by introducing the solution of liquid crystal and polymerizable material between two substrates. The substrates, which are typically glass or plastic sheets, are spaced apart and sealed around the edges. Once the liquid crystal material is disposed between the substrates, the composition is polymerized to form a thin film. The inner surfaces of the substrates are typically treated with, for example, rubbed polyamide layers or other chemicals to induce surface alignment of the liquid crystal molecules parallel to the cell walls. Transparent electrodes are typically coated onto the substrates to switch the material in the thin film between electrooptical conditions.

SUMMARY OF THE INVENTION

The method of making electro-optical materials of the invention advantageously improves the ease with which displays may be made. As with prior methods, various techniques of matching and mismatching the indices of refraction of the liquid crystal and polymer may be employed in accordance with the instant invention, and materials may be selected to obtain haze-free transparency for all viewing angles. However, because the polymer content is low, index matching is not of significant importance. The method of the invention differs from prior methods in that the light modulating liquid crystalline material is polymerized in bulk prior to formation of a thin film. Rather than forming the light modulating film in situ by polymerization between two substrates, the material of the invention is prepared as a liquid crystalline paste that can be subsequently coated onto a suitable substrate to the desired film thickness. This provides significant commercial and industrial advantages over prior methods.

The method of the invention is particularly suitable for the preparation of large surface area displays because the liquid crystal material is first prepared as a paste which can be easily coated over large surfaces. This eliminates the difficulties associated with maintaining the critical tolerances in the spacing of two substrates, filling the cell with liquid crystal solution and sealing it, all of which become more difficult as the size and surface area of the display increases. The material can be manufactured on an industrial scale since it is prepared in bulk and there is no theoretical limit to the volume that can be prepared in a given batch. Since the properties of the liquid crystalline paste do not vary over time, it can be shipped to different locations, such as manufacturing plants, assembly plants or to individual laboratories for subsequent film preparation. Any excess material may be stored for future use. Moreover, no special surface alignment is required so it is not necessary to treat the surfaces of the substrate in order to obtain a switchable display.

A preferred method of producing thin electrically addressable light modulating liquid crystalline films according to the invention comprises the steps of preparing a solution comprising a polymerizable monomeric material in a mesogenic solvent having positive dielectric anisotropy. The solution is then polymerized in bulk until the monomeric material polymerizes and phase separates from the mesogenic solvent to form a spreadable liquid crystalline paste. Thereafter, the liquid crystal paste is coated onto a substrate to form an electrically addressable thin film. Preferably, the polymerizing step is carried out when the mesogenic solvent is in the isotropic phase. The monomeric material should comprise no more than about 8% of the composition based on the weight of monomeric material and mesogenic solvent. Preferably, the monomeric material comprises from about 0.5 to 5% by weight of mesogenic solvent and monomer. Other additives such as pleochroic dyes, photo-initiators and thermal initiators may be added. Accordingly, the polymerization may be either photoinitiated or thermally initiated. A preferred photo-initiator is benzoin methyl ether (BME).

Another embodiment of the method of the invention comprises the steps of polymerizing the monomeric material to form a light transmissive polymer, then dissolving the light transmissive polymer in a mesogenic solvent having positive dielectric anisotropy at high temperature. Upon cooling the solution in bulk the polymer material phase separates from the mesogenic solvent to form a spreadable liquid crystalline paste which, thereafter, can be coated onto a substrate to form a thin film thereon.

In still a further embodiment, the method according to the invention comprises the steps of dissolving a monomeric material in a non-mesogenic solvent and polymerizing the monomeric material. A mesogenic solvent having positive dielectric anisotropy is then added to the bulk solution of monomeric material and non-mesogenic solvent and the non-mesogenic solvent gradually removed until the polymerized monomeric material phase separates from the solution to form a spreadable liquid crystalline paste. The thin film is thereafter prepared by coating the liquid crystalline paste onto a substrate.

The method of the invention can be used to prepare a wide variety of electrically addressable light modulating devices. In each case it provides a liquid crystalline light modulating material that is haze free for all viewing angles and has excellent contrast. Upon polymerization a loose polymer matrix is formed within the liquid crystal material. The material appears opaque in the absence of a field because the liquid crystal directors are randomly aligned and hence, scatter light. In the presence of a sufficiently strong electric field the liquid crystal directors are aligned so that incident light is transmitted through the material. When the field is turned off again, the liquid crystals relax to a random alignment again, in part due to the elastic effects of the polymer matrix.

The advantages of employing a spreadable liquid crystal paste material improves the ease with which most electrically addressable liquid crystal devices can be made.

DETAILED DESCRIPTION OF THE INVENTION

The method of the invention is an improvement in the preparation of liquid crystal-polymer films comprising the essential steps of inducing phase separation of a suitable monomer and liquid crystalline material in bulk and subsequently coating it onto a substrate. Monomeric materials suitable for the invention include any crosslinkable monomers capable of dissolving in the mesogenic solvent and that will form a light transmissive polymer that will phase separate from the mesogenic solvent upon polymerization. Such monomers have at least two polymerizable double bonds so as to be crosslinkable and include bisacrylates and the like. Preferably the monomeric material is 4,4'-bisacryloylbiphenyl (BAB). The material should contain less than about 8% polymer. Best results are obtained when the polymer is present in an amount from about 0.5 to 1.5%. Of course, the amount of polymer may be varied to alter the paste consistency as desired and suitable nonomesogenic solvents may be added to adjust the consistency.

Suitable mesogenic solvents are mesogenic materials having positive dielectric anisotropy. More specifically, by mesogenic solvent there is contemplated nematic, smectic, ferroelectric and cholesteric liquid crystalline material or mixtures thereof. Preferably, the mesogenic solvent is a nematic liquid crystal which may optionally contain chiral or cholesteric materials. Examples of suitable mesogenic solvents are E7 which is a mixture of cyanobiphenyls, 4,4'-cyanooctylbiphenyl (8CB), and 4,4'-cyanopentylbiphenyl (5CB), all of which are commercially available from EM Industries, an E. Merck company.

Polymerization in bulk means that the monomeric material is not polymerized in a thin film between substrates and instead, is only made into a thin film after polymerization. To be considered "bulk" the smallest dimension of the volume of material being polymerized should be on the order of at least about 0.5 centimeters or more. A typical sample volume is between 0.5 to 2 cm$^3$, although there is no theoretical upper limit to the size or volume of material being polymerized in bulk. Polymerization on an industrial scale is therefore possible. The minimum mass of a sample being polymerized in bulk is on the order of grams. By contrast, non-bulk polymerizations of thin films are conducted at thicknesses on the order of 10 $\mu$m and the masses are in the range of 10–100 mg. As suitable photo and thermal initiators there may be used any initiator known to those skilled in the art. A preferred photo-initiator is benzoin methyl ether (BME).

According to a first embodiment of the method of the invention a solution of about 0.5 to 5% of the monomeric material based on the total weight of solvent and monomeric material is prepared. Polymerization of the bulk solution is induced by U. V. light or thermally. When polymerization has progressed for a sufficient period the polymer phase separates from the mesogenic solvent to form a liquid crystalline paste. The paste may then be spread into a thin film on an appropriate substrate immediately, or stored for use at a later time. Typically, the substrates, such as glass plates with indium tin oxide transparent electrodes coated thereon are cleaned with acetone and rinsed with distilled water. Next spacers, such as polystyrene balls, and a proper amount of paste is spread onto one plate using a spatula. Finally, the other plate is pressed onto the first plate to achieve the desired film thickness. Excess paste may be removed from the edges and returned to the bulk for use at a later time. Transparent electrodes may be incorporated onto the substrates in the normal manner known to those of ordinary skill in the art.

The films prepared by the method of the invention are normally in a light scattering opaque state. The material scatters light in the absence of a field because the liquid crystal directors are randomly oriented in the paste. The material can be switched to a haze free transparent state by electrical fields in the range of 1–10 V/$\mu$m of film thickness or by magnetic fields. A sufficiently strong electric field operates to align the liquid crystal directors so that light is transmitted through the material. Since the amount of polymer is low, its index of refraction will have a negligible effect on the transparency of the material so that light transmission is haze free. When the field is removed, the material returns to the light scattering state wherein the liquid crystal directors are randomly oriented due to the elastic forces of the polymer. The invention is further illustrated in the following non-limiting examples.

EXAMPLE 1

A 1 gram liquid crystalline paste sample was prepared from a solution of 5CB, 1 wt % BME and 0.5 wt % BME. The sample volume was about 0.6 to 1 cm$^3$. The sample was U. V. irradiated with an NuArc high pressure mercury lamp with an intensity of 3mW/cm$^2$. The sample was contained in a 1 cm diameter tube and the radiation was applied vertically. The sample was cured at 55° C. with stirring for 40 minutes and the solution was in the isotropic phase. Upon phase separation the mixture became a paste.

20 $\mu$m films were prepared from this paste after three weeks and after six weeks. At 22° C. the $U_{sat}$ switching voltage was 40V and the switching times were measured at 15 ms. The contrast ratios were measured using a laser and photodiode. A contrast ratio of 50 was measured for these films.

EXAMPLE 2

A 1 gram sample was prepared according to the procedure in example 1 except that the solution contained 1.5% BAB, 0.75% BME and was cured for 25 minutes with stirring. A 20 $\mu$m film was prepared after two weeks. The $U_{sat}$ switching voltage was 70V and the switching time was 7ms. The contrast ratio for this film was 300.

EXAMPLE 3

A 1 gram sample of paste was prepared as in examples 1 and 2 from a solution of 5CB, 3.0% BAB and 0.8% BME. A liquid crystal paste was obtained after curing for 25 minutes with stirring. A 10 μm film was prepared from this paste after one day. The $U_{sat}$ switching voltage was 80V and the switching time was 3 ms. The contrast ratio for this film was 200.

EXAMPLE 4

A 2 gram sample was prepared from a solution of E7, 1.5 wt % BAB and 0.75 wt % BME. The sample was irradiated in a 1 cm diameter tube at an intensity of 3 mW/cm². The curing time was 40 minutes at 65° C. with stirring. A tin film was prepared after one day. The $U_{sat}$ switching voltage was 60V and the switching time was 0.5 ms. The contrast ratio for this film was 80.

EXAMPLE 5

A 2 gram sample was prepare as in example 4 except that the solution contained 2.2% BAB, 1.0% BME and was cured for 35 minutes with stirring. A 20 μm film was prepared after one day. The $U_{sat}$ switching voltage was 150V and the switching time was 0.3 ms. The contrast ratio for this film was 200.

EXAMPLE 6

The paste from example 5 was then used to prepare a 5 μm film after two weeks. The $U_{sat}$ switching voltage was 50V and the switching time was 0.3 ms. The contrast ratio for this film was 40.

EXAMPLE 7

A 2 gram sample was prepared as in example 4 except that the solution further contained 1 wt % dye (Q-Switch-I, Exciton Inc., Dayton, Ohio). A 10 μm film was prepared after one month. The $U_{sat}$ switching voltage was 50V and the switching time was 0.5 ms. The contrast ratio for this film was 50.

EXAMPLE 8

A 0.6 gram sample was prepared from a solution of 8CB, 1.5 wt % BAB and 0.8 wt % BME. This sample was irradiated at 55° C. for 35 minutes at the intensity used in the previous examples. The liquid crystal in this sample was in the smectic A phase during polymerization. A 10 μm film was prepared after two days. The $U_{sat}$ switching voltage was 60V and the switching time was 100 ms. The contrast ratio for this film was 10.

All of the samples prepared in the previous examples had a paste like consistency, examples 3 and 5 being the hardest. The films appeared turbid and are strongly light scattering. The threshold switching voltage for each of the above examples was between 3–6V. Moreover, the electro-optical properties of the displays were independent of the period of time the paste material was stored prior preparation of the thin films. Threshold voltages correspond to the voltage where the transmittance reaches 10% of the maximum. The saturation voltages ($U_{sat}$) correspond to the voltage where the transmittance is 90% of the maximum. The pastes can be solved in, for example, chloroform and upon evaporation of the solvent the material returns to its paste consistency and retains its original properties.

Another embodiment of the method of the invention involves first dissolving the monomers in a suitable non-mesogenic solvent, such as $CH_3Cl$. Polymerization of this solution is then induced either thermally or by light. Upon polymerization of the monomer the resulting polymer stays in solution. The mesogenic material is then added to the solution of non-mesogenic solvent and polymer and the non-mesogenic solvent gradually removed by, for example, evaporation. When the evaporation has progressed sufficiently, the polymer phase separates from the solution to form the liquid crystalline paste. This embodiment is illustrated in the following non-limiting example.

EXAMPLE 9

A solution was prepared by dissolving 1.5 wt % BAB and 0.8 wt % BME in 1 gram of chloroform ($CH_3Cl$). The solution was cured at 55° C. under the 3 mW/cm² UV source for 40 minutes. 1 gram of 5CB was then dissolved in the solution and the chloroform evaporated at room temperature to obtain a liquid crystalline paste. This paste also contained fluid and rubber like portions.

A 20 μm film was prepared from this paste after 3 months. The $U_{sat}$ switching voltage was 50V and the switching time was 10 ms. The contrast ratio for this film was 3. As with the previous examples, the threshold switching voltage for this paste was between 3–6V and the electro-optical properties of the display unaffected by the storage time of the paste.

According to another embodiment of the invention the monomer can be first polymerized and then dissolved in the mesogenic solvent at elevated temperature. The phase separation occurs upon cooling to form the liquid crystalline paste as seen in the following non-limiting example.

EXAMPLE 10

A solution was prepared by dissolving 1.5 wt % BAB and 0.8 wt % BME in 1 gram of chloroform. The solution was cured as in example 9 for 40 minutes. The chloroform was then evaporated at room temperature for about three days to form a yellow powder. This powder was then dissolved in 1 gram of 5CB with stirring to form the liquid crystalline paste. This material also contained fluid and rubber like portions.

A 20 μm film was prepared from this paste after 3 months. The $U_{sat}$ switching voltage was 50V and the switching time was 30 ms. The contrast ratio for this film was 7. The threshold switching voltage for this film was also between 3–6V and the quality of the display independent of the storage time.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A method of producing a thin electrically addressable light modulating liquid crystalline film comprising the steps of:
   a) preparing a solution comprising a polymerizable monomeric material in a mesogenic solvent having positive dielectric anisotropy;
   b) polymerizing said solution in bulk until said monomeric material polymerizes and phase separates from the mesogenic solvent to form a spreadable liquid crystalline paste; and thereafter, c) coating said liquid crystal paste onto a substrate to form a thin electrically addressable film.

2. The method according to claim 1, wherein the polymerizing step is carried out when the mesogenic solvent is in the isotropic phase.

3. The method according to claim 1, wherein said monomeric material is added in an amount from about 0.5 to 5% by weight based on the weight of solvent and monomer.

4. The method according to claim 1, wherein the solution is photopolymerized.

5. The method according to claim 1, wherein the solution is thermally polymerized.

6. The method according to claim 1, which includes adding nematic liquid crystal as a component of the mesogenic solvent.

7. The method according to claim 6, further including adding a cholesteric liquid crystal material as a component of the mesogenic solvent.

8. A method of producing a thin electrically addressable light modulating liquid crystalline film comprising the steps of:
   a) polymerizing a monomeric material to form a light transmissive polymer;
   b) dissolving said light transmissive polymer in a mesogenic solvent having positive dielectric anisotropy;
   c) cooling the solution in bulk until said polymer material phase separates from the mesogenic solvent to form a spreadable liquid crystalline paste; and thereafter,
   d) coating said liquid crystalline paste onto a substrate to form a thin electrically addressable film thereon.

9. The method according to claim 8, wherein said monomeric material is added in an amount from about 0.5 to 5% by weight based on the weight of the solvent and monomer.

10. The method according to claim 8, which includes adding nematic liquid crystal as a component of the mesogenic solvent.

11. The method according to claim 10, further including adding cholesteric liquid crystal material as a component of the mesogenic solvent.

12. A method of producing a thin electrically addressable light modulating liquid crystalline film comprising the steps of:
   a) dissolving a monomeric material in a non-mesogenic solvent;
   b) polymerizing said monomeric material;
   c) adding a mesogenic solvent having positive dielectric anisotropy to the bulk solution of monomeric material and non-mesogenic solvent;
   d) removing said non-mesogenic solvent until the polymerized monomeric material phase separates from said solution to form a spreadable liquid crystalline paste; and thereafter,
   e) coating said liquid crystalline paste onto a substrate to form a thin electrically addressable film thereon.

13. The method according to claim 12, wherein said monomeric material is added in an amount from about 0.5 to 5% by weight based on the weight of the solvent and monomer.

14. The method according to claim 12, which includes adding nematic liquid crystal material as a component of said mesogenic solvent.

15. The method according to claim 14, further including adding cholesteric liquid crystal material as a component of said mesogenic solvent.

16. An electrically addressable light modulating liquid crystalline paste formed by the process comprising the steps of:
   a) preparing a solution comprising a polymerizable monomeric material in a mesogenic solvent having positive dielectric anisotropy;
   b) polymerizing said solution in bulk until said monomeric material polymerizes and phase separates from the mesogenic solvent to form a spreadable liquid crystalline paste.

17. The liquid crystalline paste according to claim 16, wherein said polymerization is carried out when the mesogenic solvent is in the isotropic phase.

18. An electrically addressable light modulating liquid crystalline paste formed by the process comprising the steps of:
   a) polymerizing a monomeric material to form a light transmissive polymer;
   b) dissolving said light transmissive polymer in a mesogenic solvent having positive dielectric anisotropy;
   c) cooling the solution in bulk until said polymer material phase separates from the mesogenic solvent to form a spreadable liquid crystalline paste.

19. An electrically addressable light modulating liquid crystalline paste formed by the process comprising the steps of:
   a) dissolving a monomeric material in a non-mesogenic solvent;
   b) polymerizing said monomeric material;
   c) adding a mesogenic solvent having positive dielectric anisotropy to the bulk solution of monomeric material and non-mesogenic solvent;
   d) removing said non-mesogenic solvent until the polymerized monomeric material phase separates from said solution to form a spreadable liquid crystalline paste.

* * * * *